(12) United States Patent
Sugama

(10) Patent No.: US 12,077,189 B2
(45) Date of Patent: Sep. 3, 2024

(54) INFORMATION PROCESSING DEVICE, INFORMATION PROCESSING SYSTEM, AND INFORMATION PROCESSING METHOD

(71) Applicant: MITSUBISHI ELECTRIC CORPORATION, Tokyo (JP)

(72) Inventor: Yasushi Sugama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 357 days.

(21) Appl. No.: 17/692,737

(22) Filed: Mar. 11, 2022

(65) Prior Publication Data

US 2022/0194430 A1 Jun. 23, 2022

Related U.S. Application Data

(63) Continuation of application No. PCT/JP2019/042982, filed on Nov. 1, 2019.

(51) Int. Cl.
*B60W 60/00* (2020.01)
*B60W 40/04* (2006.01)

(52) U.S. Cl.
CPC ........ *B60W 60/0027* (2020.02); *B60W 40/04* (2013.01); *B60W 2554/20* (2020.02); *B60W 2554/4041* (2020.02)

(58) Field of Classification Search
CPC ............. B60W 60/0027; B60W 40/04; B60W 2554/20; B60W 2554/4041;

(Continued)

(56) References Cited

U.S. PATENT DOCUMENTS

| 2020/0307617 A1 | 10/2020 | Sakai et al. | |
| 2021/0056712 A1* | 2/2021 | Daudelin | G06V 20/58 |
| 2021/0131823 A1* | 5/2021 | Giorgio | G01S 17/931 |

FOREIGN PATENT DOCUMENTS

| CN | 109443369 A | * | 3/2019 |
| CN | 109829386 A | * | 5/2019 |

(Continued)

OTHER PUBLICATIONS

Chinese Office Action and Search Report for Chinese Application No. 201980101463.8, dated Jul. 27, 2023, with English translation of the Office Action.

(Continued)

*Primary Examiner* — Mary Cheung
(74) *Attorney, Agent, or Firm* — Birch, Stewart, Kolasch & Birch, LLP

(57) ABSTRACT

An information processing device with improved prediction accuracy of the moving routes of obstacles is obtained. The information processing device according to the present disclosure includes an object position information acquisition unit to acquire obstacle position information showing a position of at least one obstacle existing around a vehicle, an obstacle potential map generation unit to generate an obstacle potential map of risk of a traffic accident for the at least one obstacle based on the obstacle position information, and an obstacle moving route prediction unit to predict a moving route of the at least one obstacle based on the obstacle potential map and generate obstacle moving route prediction information.

6 Claims, 13 Drawing Sheets

(58) Field of Classification Search
CPC ..... B60W 2420/403; B60W 2420/408; B60W 30/09; B60W 2556/50; B60W 30/095; G08G 1/16
See application file for complete search history.

(56) References Cited

FOREIGN PATENT DOCUMENTS

| | | | |
|---|---|---|---|
| CN | 109901194 A | * | 6/2019 |
| JP | 2009-116790 A | | 5/2009 |
| JP | 2011-186878 A | | 9/2011 |
| JP | 2011-221667 A | | 11/2011 |
| JP | 2017-182568 A | | 10/2017 |
| JP | 2018-84972 A | | 5/2018 |
| JP | 6571904 B1 | | 9/2019 |
| WO | WO 2019/098216 A1 | | 5/2019 |
| WO | WO 2020/044512 A1 | | 3/2020 |

OTHER PUBLICATIONS

International Search Report (PCT/ISA/210) issued in PCT/JP2019/042982 mailed on Nov. 26, 2019.
Written Opinion (PCT/ISA/237) issued in PCT/JP2019/042982 mailed on Nov. 26, 2019.

* cited by examiner

INFORMATION PROCESSING DEVICE, INFORMATION PROCESSING SYSTEM, AND INFORMATION PROCESSING METHOD

CROSS REFERENCE TO RELATED APPLICATIONS

This application is a Continuation of PCT International Application No. PCT/JP2019/042982, filed on Nov. 1, 2019, which is hereby expressly incorporated by reference into the present application.

TECHNICAL FIELD

The present disclosure relates to an information processing device that predicts moving routes of obstacles around a vehicle, an information processing system using the same, an information processing method for the same, and an information processing program for the same.

BACKGROUND TECHNOLOGY

As a technique used for a vehicle, particularly for a self-driving vehicle, to avoid obstacles on a route on which the vehicle travels, there is a technique called the potential method (for example, Patent Document 1). In the potential method, in a plan called a potential map where a vehicle is seen from above, two-dimensional data in which areas that the vehicle should avoid are set by the magnitudes of potential values is generated first. In this, the movements of the obstacles are predicted by, for example, a Kalman filter, and a potential map for the vehicle is generated based on the predicted moving routes of the obstacles. The larger potential value in the potential map means the larger necessity of the sure avoidance.

Then, in the potential method, traveling control of the vehicle is performed by using the potential map so that the vehicle will pass through the route with the minimum total sum of the potential values among the routes that the vehicle can move through.

PRIOR ART LITERATURE

Patent Documents

[Patent Document 1] Japanese Patent Application No. 2019-523880

SUMMARY OF THE INVENTION

Problems to Be Solved by the Invention

In the technique of Patent Document 1, the moving routes of obstacles, such as oncoming vehicles, existing around a vehicle are predicted on the assumption that they are in their constant acceleration linear motions. However, the actual obstacles are not always in their constant acceleration linear motions. Therefore, the technique of Patent Document 1 has a problem that the prediction may be inaccurate in some cases.

The present disclosure is made to solve the above problem, and its object is to obtain an information processing device with improved prediction accuracy for the moving routes of obstacles.

Means for Solving the Problems

The information processing device according to the present disclosure includes: an object position information acquisition unit to acquire obstacle position information showing a position of at least one obstacle existing around a vehicle and vehicle position information showing a position of the vehicle; an obstacle potential map generation unit to generate an obstacle potential map of risk of a traffic accident for the at least one obstacle based on the obstacle position information; an obstacle moving route prediction unit to predict a moving route of the at least one obstacle based on the obstacle potential map and to generate obstacle moving route prediction information; and a vehicle potential map generation unit to generate, based on the vehicle position information and the obstacle moving route prediction information, a dynamic potential map of risk of a traffic accident for the vehicle in a case where the at least one obstacle moves along the predicted moving route shown by the obstacle moving route prediction information, wherein the object position information acquisition unit acquires, as the obstacle position information, position information including stationary obstacle position information showing a position of at least one stationary obstacle out of the at least one obstacle and moving obstacle position information showing a position of at least one moving obstacle out of the at least one obstacle, the obstacle potential map generation unit generates, as the obstacle potential map, a moving obstacle potential map of risk of a traffic accident for the at least one moving obstacle based on the moving obstacle position information, the obstacle moving route prediction unit generates, as the obstacle moving route prediction information, moving obstacles' moving route prediction information predicting a moving route of the at least one moving obstacle based on the moving obstacle potential map, and the vehicle potential map generation unit includes a static potential map generation unit to generate a static potential map of risk of a traffic accident for the vehicle, the risk being caused at least by the at least one stationary obstacle, based on at least the stationary obstacle position information in addition to the vehicle position information, and a dynamic potential map generation unit to generate the dynamic potential map based on the static potential map and the moving obstacles' moving route prediction information.

Advantageous Effects of the Invention

The information processing device according to the present disclosure includes the obstacle potential map generation unit to generate an obstacle potential map of risk of a traffic accident for the at least one obstacle based on the obstacle position information and the obstacle moving route prediction unit to predict a moving route of the at least one obstacle based on the obstacle potential map and to generate obstacle moving route prediction information. Therefore, the prediction accuracy of the moving route of the at least one obstacle can be improved by taking the surroundings of the at least one obstacle into account.

DESCRIPTION OF EMBODIMENTS

Embodiment 1

Figure 1:
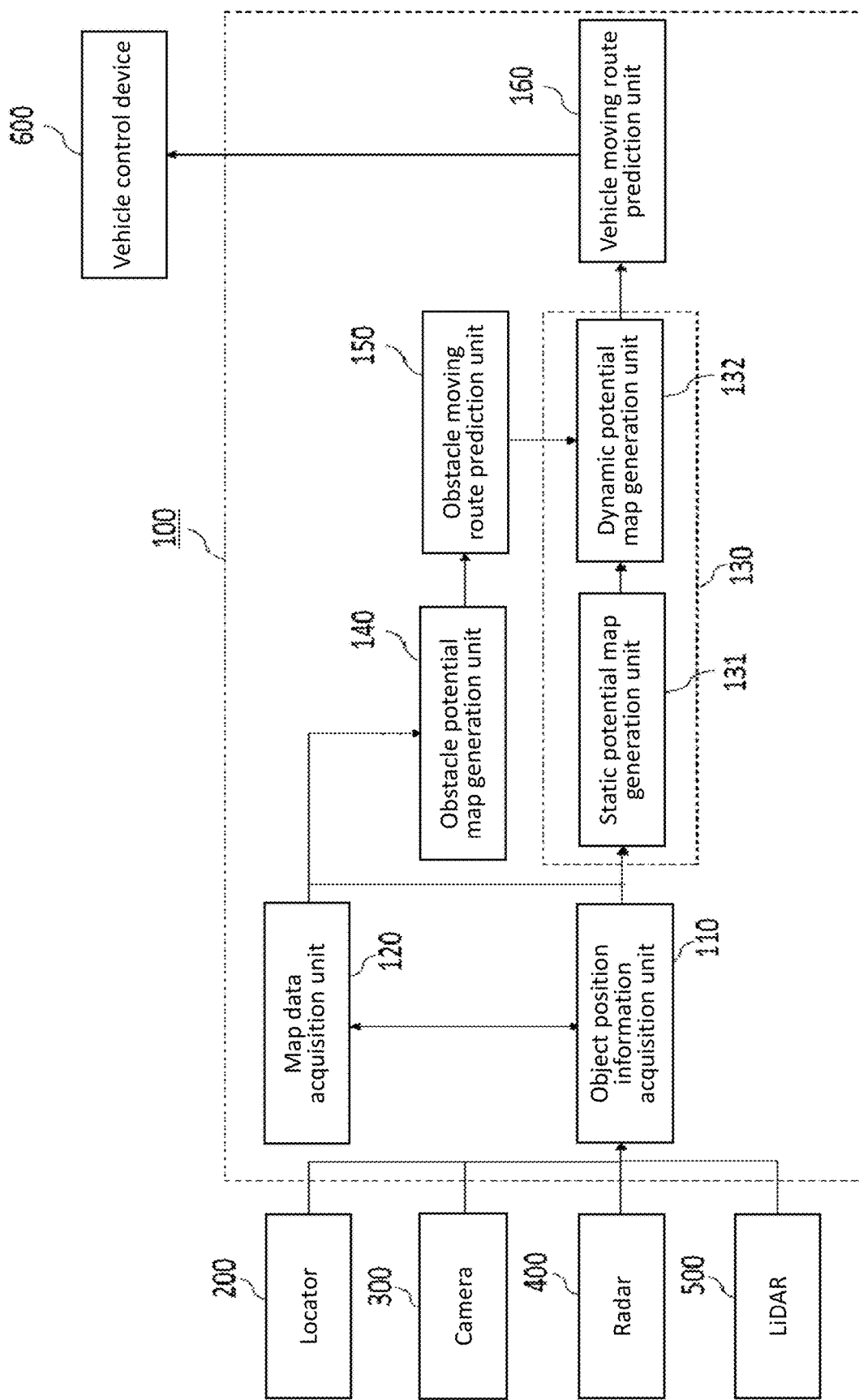
FIG. 1 is a diagram showing a configuration of an information processing system 1000 according to Embodiment 1.

FIG. 1 is a diagram showing a configuration of an information processing system 1000 according to Embodiment 1. The information processing system 1000 includes an information processing device 100, a locator 200, a camera 300, a radar 400, a light detection and ranging (LiDAR) 500, and a vehicle control device 600. In Embodiment 1, the information processing system 1000 is an in-vehicle system to be mounted on one vehicle CA (not shown).

The locator 200 is a device that locates a position of the vehicle CA, which includes, for example, a global navigation satellite system (GNSS) receiver, an inertial navigation system, an odometry system, or the like. In Embodiment 1, the locator locates the position of the vehicle CA by decoding and analyzing the information obtained from the GNSS receiver, the inertial navigation system, or the odometry system, and transmits vehicle position information showing the position of the vehicle CA to the information processing device 100.

Alternatively, the locator 200 may use information from various sensors to be described later to estimate the position of a subject vehicle.

The camera 300, the radar 400, and the LiDAR 500 are sensors that detect surroundings around the vehicle CA.

The camera 300 takes images of the surroundings around the vehicle CA. In Embodiment 1, the camera 300 transmits the image data obtained by capturing images to the information processing device 100.

The radar 400 is a device that senses the surroundings around the vehicle CA by radio waves, for example, by millimeter waves. It measures distances, velocities, and angles, etc. of the obstacles. The distances here are those between the obstacles existing around the vehicle CA and the vehicle CA. In Embodiment 1, the radar 400 transmits the radar data obtained by sensing to the information processing device 100.

The LiDAR 500 is a device that senses the surroundings around the vehicle CA by laser light and measures the distances between the obstacles existing around the vehicle CA and the vehicle CA, the velocities and angles, etc. of the obstacles. In general, the radar 400 is excellent in environmental robustness, whereas the LiDAR 500 can measure distance and orientation with high spatial resolution. In Embodiment 1, the LiDAR 500 transmits the point cloud data obtained by sensing to the information processing device 100. In the following, the image data obtained by the camera 300, the radar data obtained by the radar 400, and the point cloud data obtained by the LiDAR 500 are collectively referred to as sensor data.

The vehicle control device 600 is a device that performs various controls for the vehicle CA to perform automatic driving. For example, an electronic control unit (ECU) for vehicle, which controls steering, accelerator, brake, and the like, is used for it. In Embodiment 1, when the vehicle CA performs automatic operation, the vehicle control device 600 controls the vehicle based on a predicted moving route of the vehicle CA, the moving route predicted by the information processing device 100.

The information processing device 100 is a device that predicts moving routes of the obstacles existing around the vehicle CA, and in Embodiment 1, the information processing device 100 is an in-vehicle device mounted on the vehicle CA.

The information processing device 100 includes an object position information acquisition unit 110, a map data acquisition unit 120, a vehicle potential map generation unit 130, an obstacle potential map generation unit 140, an obstacle moving route prediction unit 150, and a vehicle moving route prediction unit 160.

The object position information acquisition unit 110 is a unit that acquires object position information showing the positions of objects, and in Embodiment 1, the object position information acquisition unit 110 acquires vehicle position information showing the position of the vehicle and obstacle position information showing the positions of the obstacles existing around the vehicle CA. The obstacle position information acquired by the object position information acquisition unit 110 includes stationary obstacle position information showing the positions of stationary obstacles among the obstacles and moving obstacle position information showing the positions of moving obstacles among the obstacles. Here, the stationary obstacles include obstacles such as a guardrail and a building, which are stationary, and the moving obstacles include obstacles such as a vehicle and a pedestrian, which move.

Further, the object position information acquisition unit 110 recognizes attributes of the obstacles around the vehicle based on the sensor data and acquires obstacle attribute information showing the attributes of the obstacles. In the following, the obstacle position information and the obstacle attribute information are collectively referred to as obstacle information. Here, the attribute of an obstacle is information showing the classification whether the obstacle is a stationary obstacle or a moving obstacle, the type of the obstacle such as pedestrian, vehicle and bicycle, and the physical quantity of the obstacle such as predicted mass of the obstacle and area of the obstacle seen from the vehicle CA, and the like.

The object position information acquisition unit 110 acquires the vehicle position information from the locator 200 and the sensor data from the camera 300, the radar 400, and the LiDAR 500 to recognize the obstacles around the vehicle CA, thereby acquiring the obstacle information. In the previous description, the object position information acquisition unit 110 is described to acquire the vehicle position information by receiving it from the locator 200. However, the object position information acquisition unit 110 may acquire the vehicle position information by calculating by itself the position of the vehicle CA using the information of the various sensors.

Here, the object position information acquisition unit 110 is described to acquire the object position information based on the sensor data acquired from the various sensors. However, the object position information acquisition unit 110 may acquire the object position information by communicating with an external server or another vehicle. The obstacle information may be acquired, for example, by communicating with another vehicle and exchanging information showing their respective positions, or from dynamic map data if the map data acquisition unit 120, described later, acquires the dynamic map data.

The map data acquisition unit 120 is a unit that acquires map data around the vehicle CA. In Embodiment 1, the map data acquisition unit 120 acquires the map data around the vehicle CA based on the vehicle position information acquired from the object position information acquisition unit 110. In Embodiment 1, the map data acquisition unit 120 is described to acquire the map data from an external server. However, the information processing device 100 may include a storage unit that stores map data and acquire the map data by reading it out from the storage unit.

The vehicle potential map generation unit 130 is a unit that generates a vehicle potential map showing the risk of a traffic accident for the vehicle CA. In Embodiment 1, the vehicle potential map generation unit 130 generates, based on the vehicle position information and obstacle moving route prediction information, which is described later, a dynamic potential map, which is a vehicle potential map when the obstacles move along their predicted moving routes shown by the obstacle moving route prediction information.

Here, the potential map is spatial information in which the risk of a traffic accident is quantified for each spatial position. The traffic accident includes a contact between the vehicle CA and an obstacle, a departure of the vehicle CA from the roadway, and the like. For example, when the vehicle CA approaches an oncoming vehicle or an edge of the road, the risk of a traffic accident increases. Therefore, in the potential map in which the vehicle CA is centered, the larger values are given for the positions of the oncoming vehicles or the edges of the road. The potential map is generally generated as two-dimensional data in a horizontal plane with the vehicle looked down on from above. However, the potential map may be generated as one-dimensional data when obstacles can be avoided by acceleration or deceleration alone or as three-dimensional data by adding height to the horizontal plane in a case height information is important, for example, in a case a tunnel with height restrictions is involved.

In Embodiment 1, the vehicle potential map generation unit 130 includes a static potential map generation unit 131 and a dynamic potential map generation unit 132.

The static potential map generation unit 131 is a unit that generates, based on at least the stationary obstacle position information in addition to the vehicle position information, the static potential map that shows the risk of a traffic accident for the vehicle CA at least due to the stationary obstacles. Here, the static potential map generation unit 131 may generate, based further on the moving obstacle position information, the static potential map so as to include the risk of a traffic accident for the vehicle CA due to the moving obstacles at the present time. In the following, by incorporating also the risk due to the moving obstacles at the present time into the static potential, the static potential is generated as a vehicle potential map showing the risk of a traffic accident for the vehicle CA due to the stationary obstacles and the moving obstacles which exist at their position coordinates at the present time.

When generating a vehicle potential map, the static potential map generation unit 131 first obtains the lane center of the vehicle CA based on the vehicle position information and the map data. Based on the information showing the lane center obtained above and the obstacle information, the static potential map generation unit 131 generates a potential map in which the vehicle CA is centered. As for the way to obtain the lane center, in a case the map data contains the data of lane centers, it is good just to read out the lane center data, while in a case the map data does not contain the data of lane centers, it is good to create a curved line, as the lane center, in the middle between the road edge line at the side end of the road and the center line of the road.

The static potential map generation unit 131 generates a two-dimensional potential map R(x) at the present time based on the vehicle position information and the obstacle information acquired by the object position information acquisition unit 110. Generally, the potential map is obtained by calculating potential values at the present time T for two-dimensional coordinates x each over a prescribed area. Here, the prescribed area is, for example, an area with its radius of 100 m around the vehicle. It is an area that the designer of the information processing device 100 considers to be important for the control of the vehicle CA. It is determined by the designer setting it in advance. The static potential map can be generated according to following Formula 1 using, for example, a normal distribution whose center is an obstacle position $X_k$. Here, it is assumed that there are n+1 obstacles.

[Formula 1]

$$R(x) = \sum_{k=0}^{n} \{\alpha_k * \exp(-(X_k - x)^2 / \sigma_k^2)\} + \omega\{1 - \exp(-(x_1 - Y_r)^2 / \sigma_c^2)\}$$

Here, x is two-dimensional coordinates in the potential map, $\alpha_k$ is a weight factor, which is determined according to an attribute $K_k$ of the object, and a two-dimensional standard deviation $\sigma_k$ of the normal distribution is a value proportional to width and height of the object. $\omega$ is a weight factor with respect to a potential value of the road center, $x_1$ is a first component of the two-dimensional coordinates x in the potential map, $Y_r$ represents the lane center for the vehicle CA, and $\sigma_r$, a pre-set value, is a constant to provide the potential value at the position away from the lane center.

A concrete example of the static potential map will be described using FIG. 2 and FIG. 3.

Figure 2:
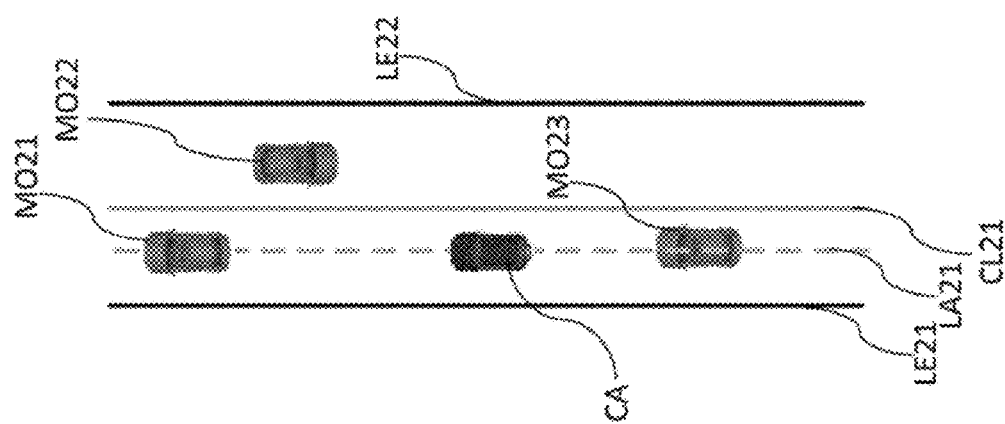
FIG. 2 is a plan view showing a vehicle CA and obstacles around the vehicle CA viewed from above.
Figure 3:
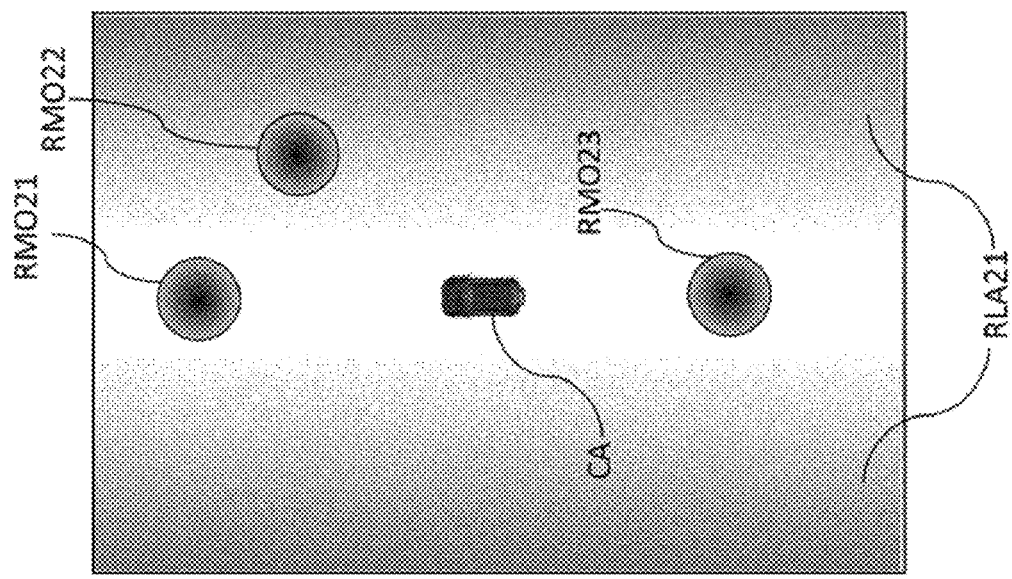
FIG. 3 is a conceptual diagram showing a concrete example of a static potential map.

FIG. 2 is a plan view showing the vehicle CA and the obstacles around the vehicle CA viewed from above, and FIG. 3 is a conceptual diagram showing a concrete example of the static potential map for the situation of FIG. 2. To make the positional relationship easier to understand, the vehicle CA shown in FIG. 2 is superimposed to be seen in FIG. 3.

The object position information acquisition unit 110 and the static potential map generation unit 131 recognize the obstacles around the vehicle CA, the wall faces, and the lane center shown in FIG. 2 by using the information of the various sensors. Then, the static potential map generation unit 131 generates a static potential map by Formula 1 based on the various information recognized. In FIG. 2, a vehicle MO21, a vehicle MO22, and a vehicle MO23 exist around the vehicle CA as moving obstacles. In FIG. 2, the leftmost straight line is a road edge line LE21, the rightmost straight line is a road edge line LE22, the middle straight line is the center line CL21, and the dashed line between the road edge line LE21 and the center line CL21 is a lane center LA21.

In FIG. 3, the risk potential RMO21 is a risk potential for the vehicle MO21 in FIG. 2, the risk potential RMO22 is a risk potential for the vehicle MO22 in FIG. 2, and the risk potential RMO23 is a risk potential for the vehicle MO23 in FIG. 2. In addition, in the areas on both the left and the right sides of the vehicle, there exists a risk potential RLA21 due to the deviation from the lane center LA21 in FIG. 2.

The dynamic potential map generation unit 132 is a unit that generates the dynamic potential map based on the static potential map and the obstacle moving route prediction information. The obstacle moving route prediction information is information generated by the obstacle moving route prediction unit 150. Therefore, the configurations of the obstacle potential map generation unit 140 and the obstacle moving route prediction unit 150 will be described first, and then the dynamic potential map generation unit 132 will be described.

The obstacle potential map generation unit 140 is a unit that generates an obstacle potential map showing the risk of a traffic accident for an obstacle based on the obstacle position information. When there is a plurality of obstacles, an obstacle potential map is generated for each of the obstacles. The obstacle potential map generation unit 140 may generate only moving obstacle potential maps, each of which shows the risk of a traffic accident for the moving obstacle, as the obstacle potential maps based on the moving obstacle position information. This is because the obstacle potential map is used to predict the moving route of the target obstacle and because the stationary obstacle is assumed not to move at all by definition. In the following, when simply referred to as an obstacle potential map, it means a moving obstacle potential map.

In the same way as the static potential map generation unit 131 obtains the lane center of the vehicle CA, the obstacle potential map generation unit 140 obtains the lane centers of other vehicles that are the moving obstacles.

The obstacle potential map generation unit 140 generates an obstacle potential map $U_i(x)$ viewed from each of the obstacles. For example, the obstacle potential map $U_i(x)$ in which the obstacle existing at a position $X_i$ is centered can be expressed as Formula 2 below.

[Formula 2]

$$U_i(x) = \sum_{k=0}^{n} \{\alpha_k * \beta_{ki} * \exp(-(X_k - x)^2 / \sigma_k^2)\} +$$

$$[\gamma_k * \exp(-(C - x)^2 / \sigma_c^2)] + \omega\{1 - \exp(-(x_i - Y_i)^2 / \sigma_r^2)\}$$

Here, the first term represents potential values of other obstacles viewed from the obstacle positioned at $X_i$, the second term represents a potential value of a subject vehicle viewed from the obstacle positioned at $X_i$, and the third term represents a potential value of the current lane viewed from the obstacle positioned at $X_i$. $\beta_{ki}$ is a coefficient that is 0 when k=i and is 1 when it's not, $\gamma_k$ is a weight value for a potential value of the subject vehicle, C is a position of the subject vehicle in the map, and a two-dimensional standard deviation $\sigma_c$ of a normal distribution is a value proportional to width and height of the subject vehicle. $Y_i$ represents a lane center for the obstacle.

The obstacle moving route prediction unit 150 is a unit that predicts the moving routes of the obstacles based on the obstacle potential maps and generates the obstacle moving route prediction information. The obstacle moving route prediction information includes moving obstacles' moving route prediction information showing the predicted moving routes of the moving obstacles. Here, the obstacle moving route prediction unit 150 may predict the moving routes only for the moving obstacles. This is because the stationary obstacles are defined as obstacles that do not move and remain stationary.

In Embodiment 1, the obstacle moving route prediction unit 150 predicts the moving route of each of the target obstacles based on the obstacle potential map $U_i(x)$ generated by the obstacle potential map generation unit 140. The moving route of the target obstacle is determined by the cost function shown below with its steering value and its acceleration value of time t denoted by, for example, $r_i(t)$ and $a_i(t)$.

[Formula 3]

$$G_i(S_{i1}(r_i(T), a_i(T)) \ldots S_{imt}(r_i(T+mu), a_i(T+mu))) =$$

$$\sum_{k=0}^{m} \{U_i(S_{ik}(r_i(T+ku), a_i(T+ku)), T+ku) +$$

$$w_r * r_i(T+ku)^2 + w_a * a_i(T+ku)^2\}$$

Here, $S_{it}(r(t), a(t))$ is the two-dimensional coordinates at time t in a case where a steering value r(t) and an acceleration a(t) are given, and $w_r$ and $w_a$ are weight values for the changes of a steering value r and an acceleration a, which are set in advance, respectively. The obstacle moving route prediction unit 150 outputs a moving route $S_{it}(r_i(t), a_i(t)), \ldots, S_{int}(r_i(nt), a_i(nt))$ that minimize the cost function. Here, the moving route $S_{it}(r(t), a(t))$ is a function of the steering value r(t) and the acceleration a(t). The steering value r(t) and the acceleration a(t) are the independent variables of it. The moving route $S_{it}(r(t), a(t))$ is determined by obtaining the steering value r(t) and the acceleration a(t) that minimize the cost function. T is a present time, u is a time span set in advance, and m is a positive integer. The designer of the information processing device 100 can set u and m according to a rule of thumb or based on the data obtained from experiments. Specifically, u can be determined by considering how frequently they would like to know the positional change of an obstacle in time and m can be determined by considering how long in the future they would like to know the obstacle's position.

Although the moving route that minimizes the cost function is used in the above description, a plurality of moving routes may be determined as predicted routes. Alternatively, it is also possible to prepare a plurality of cost functions different from the above cost function for predicting the moving routes and to predict the moving routes from their respective cost functions.

That is, the obstacle moving route prediction unit 150 may predict a plurality of moving routes for an obstacle at each time. In the following, the obstacle moving route prediction unit 150 determines as the predicted routes the moving route that makes the cost function represented by Formula 3 a minimum and the moving route that makes the cost function represented by Formula 3 the second minimum.

A concrete example of an operation to predict moving routes of an obstacle will be described using FIGS. 4 to 6.

Figure 4:
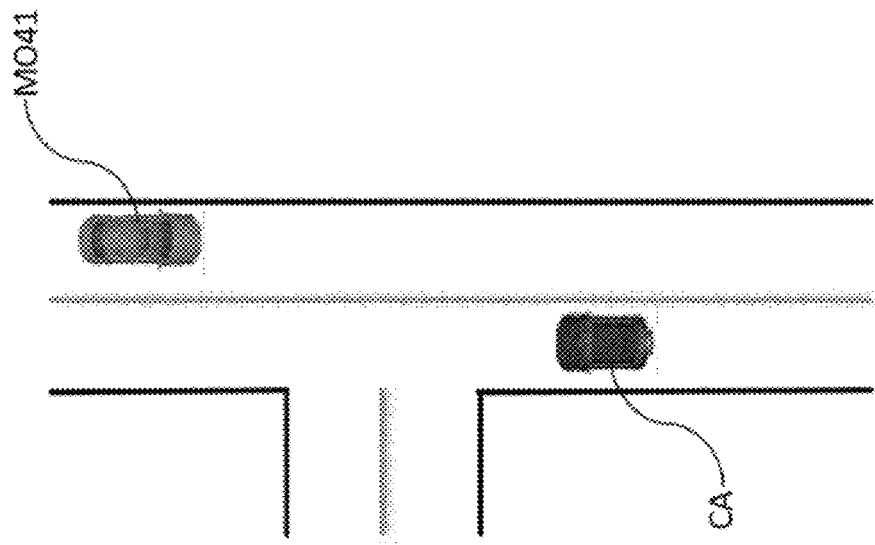
FIG. 4 is a plan view showing the vehicle CA and an obstacle around the vehicle CA viewed from above.
Figure 5:
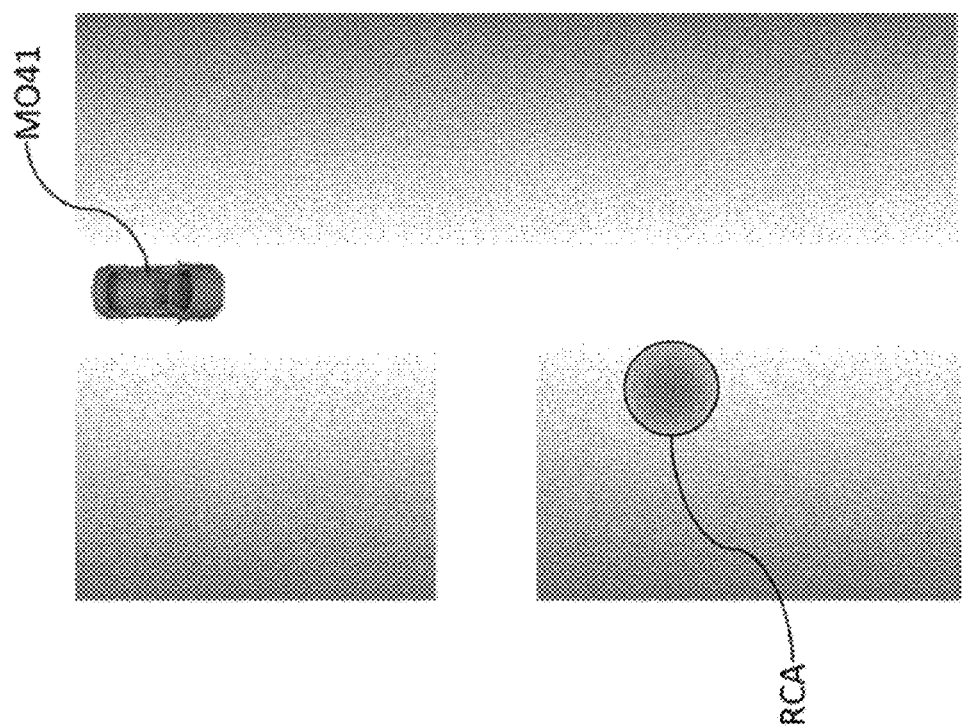
FIG. 5 is a conceptual diagram showing a concrete example of an obstacle potential map.
Figure 6:
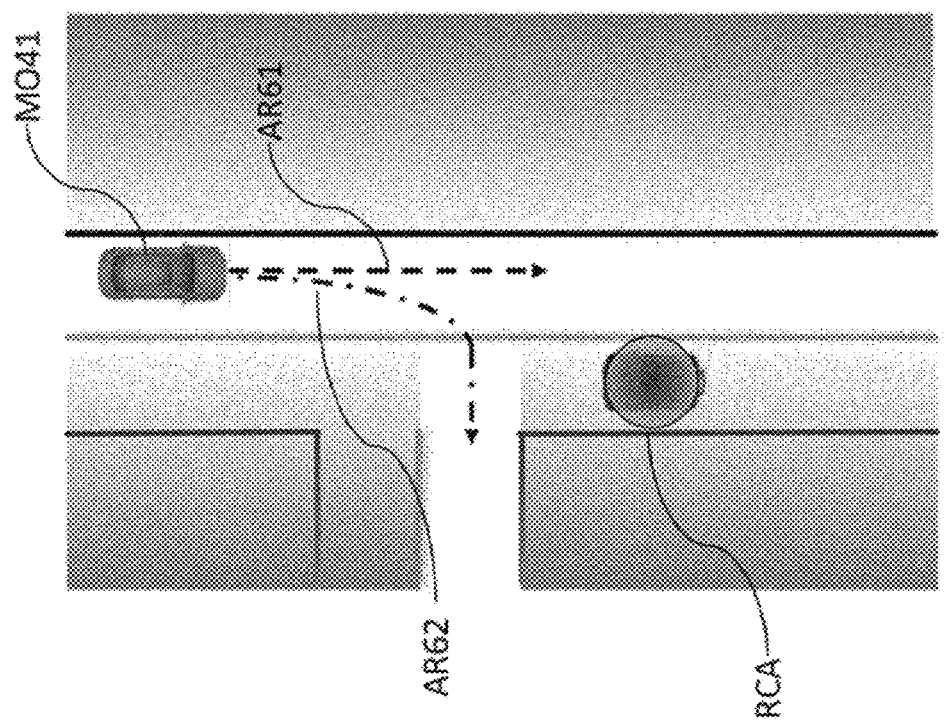
FIG. 6 is a conceptual diagram showing a concrete example of moving routes of the obstacle given by obstacle moving route prediction information.

FIG. 4 is a plan view of the vehicle CA and an obstacle around the vehicle CA viewed from above, FIG. 5 is a conceptual diagram showing a concrete example of the obstacle potential map, and FIG. 6 is a conceptual diagram showing a concrete example of the moving routes of an obstacle shown by the obstacle moving route prediction information.

In FIG. 4, a vehicle MO41, which is a moving obstacle, exists around the vehicle CA. The vehicle MO41 is an oncoming vehicle for the vehicle CA. FIG. 5 is a conceptual diagram showing an obstacle potential map which shows the risk of a traffic accident for the vehicle MO41, and the vehicle MO41 in FIG. 4 is superimposed thereon to make the positional relationship easier to understand. The risk potential RCA is a risk potential due to the vehicle CA shown in FIG. 4. The gray areas on both of the left side and the right side of the vehicle MO41 shows the risk potential by the vehicle MO41 deviating from the lane center.

FIG. 6 shows the predicted moving routes of the vehicle MO41. The moving route AR61 shown by the dashed arrow is a moving route in a case where the vehicle MO41 goes straight, and the moving route AR62 shown by the dash-dot-dash arrow is a moving route in a case where the vehicle MO2 turns right. Here, for example, if it is assumed, as in the conventional technique, that the vehicle MO41 is in a constant acceleration movement, only the moving route AR61 can be predicted as a moving route of the vehicle MO41. However, when using the obstacle potential map as in the information processing device 100 according to this embodiment, the moving route AR62 in a case of making a right turn can also be predicted as a route with a low risk potential value in addition to the moving route AR61 in a case of going straight.

Next, the dynamic potential map generation unit 132 will be described.

As described above, the dynamic potential map generation unit 132 is a unit that generates the dynamic potential map based on the static potential map and the obstacle moving route prediction information.

In Embodiment 1, the dynamic potential map generation unit 132 generates the vehicle potential map by superimposing, on the static potential map, the risk of a traffic accident for the vehicle CA which is caused by the obstacles when they are positioned on their moving routes shown by the obstacle moving route prediction information.

In Embodiment 1, the dynamic potential map generation unit 132 obtains, from the moving routes of the obstacles predicted by the obstacle moving route prediction unit 150, the positions at which the obstacles exist at predetermined multiple times. Then, the dynamic potential map reflecting the movement prediction results of the obstacles is generated by superimposing the risk potentials of the obstacles at each time on the static potential map. For example, a dynamic potential map can be generated according to Formula 4 below.

[Formula 4]
$$R'(x) = R(x) + \sum_{i=0}^{n}\sum_{k=1}^{m}\{\alpha_i * \delta_k * \exp(-S_{ik}(r_i(T+ku), a_i(T+ku)) - x)^2/\sigma_i^2)\}$$

Here, as described above, $\alpha_i$ is a weight factor determined from the object's attribute $K_i$, and a two-dimensional standard deviation $\sigma_i$ of a normal distribution is a value proportional to the width and height of an object. $\delta_k$ is a weight factor for the risk by an obstacle with respect to the potential value when the risk is superimposed at each time on the static potential map. For example, setting is made in such a way that the weight $\delta_T$ at time t=T which is closest to the present time is large and the weight $\delta_{mT}$ at time t=mT which is farthest from the present time is small.

A concrete example of the dynamic potential map will be described with reference to FIG. 7.

Figure 7:
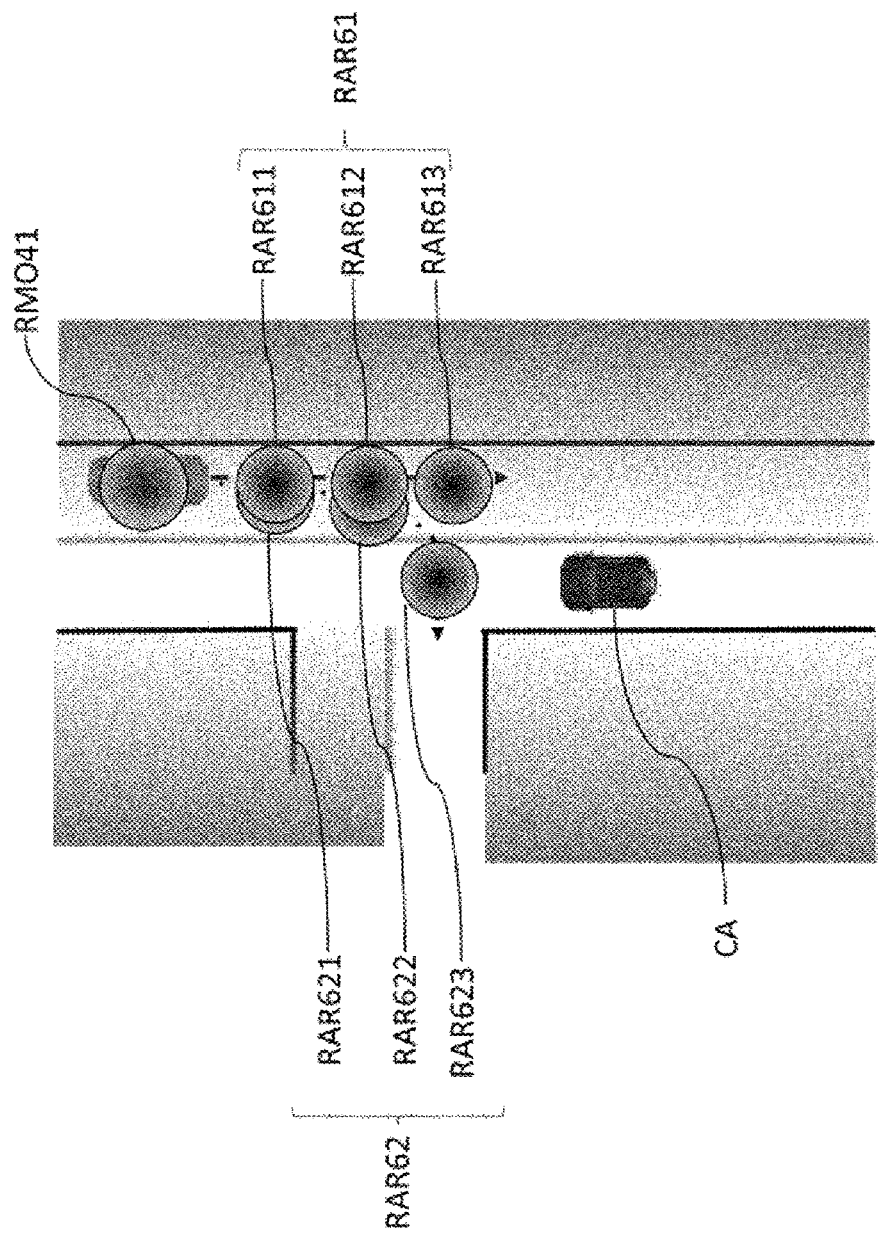
FIG. 7 is a conceptual diagram showing a concrete example of a dynamic potential map.

FIG. 7 is a conceptual diagram showing a concrete example of the dynamic potential map, which corresponds to the situation shown in FIGS. 4 to 6. To make the positional relationship easy to understand, the vehicle CA, the vehicle MO41, and each road edge line shown in FIG. 4 are superimposed. In FIG. 7, a risk potential RMO41 is the risk potential for the vehicle MO41 at the present time; a risk potential RAR61 (a risk potential RAR611, a risk potential RAR612, and a risk potential RAR613) is the risk potential for a predicted moving route AR61 in a case where the vehicle MO41 goes straight; a risk potential RAR62 (a risk potential RAR621, a risk potential RAR622, and a risk potential RAR623) is the risk potential for a predicted moving route AR62 in a case where the vehicle MO41 makes a right turn. Here, a risk potential RAR611 and a risk potential RAR621 are the risk potentials of the vehicle MO41 at time T+3u, a risk potential RAR612 and a risk potential RAR622 are the risk potentials of the vehicle MO41 at time T+2u, and a risk potential RAR613 and a risk potential RAR623 are the risk potentials of the vehicle MO41 at time T+3u. In addition, in the areas on both of the left side and the right side of the vehicle CA, there exists, as in other figures, a risk potential by the vehicle CA deviating from the lane center.

The vehicle moving route prediction unit 160 is a unit that predicts moving routes of the vehicle CA based on the vehicle potential map and generates vehicle moving route prediction information. In Embodiment 1, it predicts the moving routes of the vehicle CA based on the dynamic potential map generated by the vehicle potential map generation unit 130. The prediction of the moving routes of the vehicle CA can be performed as shown in Formula 3 in the same manner as the prediction of the moving routes of the obstacles. Here, the vehicle moving route prediction unit 160 may transmit only the information showing a moving route to the vehicle control device 600 for the vehicle control device 600 to recalculate the steering angle and velocity of the vehicle CA. Alternatively, the vehicle moving route prediction unit 160 may add the steering values and the velocities to the vehicle moving route prediction information in addition to the moving route to transmit the information to the vehicle control device 600.

Further, the vehicle moving route prediction unit 160 may output a signal to cause the vehicle CA to stop to the vehicle control device 600 when the minimum value of the cost function calculated according to Formula 3 is equal to or larger than a predetermined threshold value.

Figure 8:
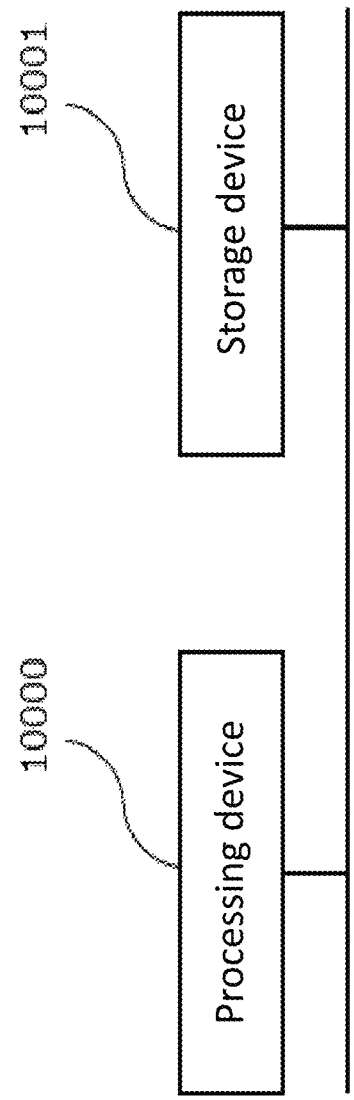
FIG. 8 is a diagram showing an example of a hardware configuration of an information processing device 100 according to Embodiment 1.

Next, a hardware configuration of the information processing device 100 according to Embodiment 1 will be described. Each function of the information processing device 100 is realized by a computer. FIG. 8 is a diagram showing an example of the hardware configuration of the computer that realizes the information processing device 100.

The hardware shown in FIG. 8 includes a processing device 10000 such as a central processing unit (CPU) and a storage device 10001 such as a read only memory (ROM) and a hard disk.

The object position information acquisition unit 110, the map data acquisition unit 120, the vehicle potential map generation unit 130, the obstacle potential map generation unit 140, the obstacle moving route prediction unit 150, and the vehicle moving route prediction unit 160, shown in FIG. 1, are realized by the processing device 10000 executing a program stored in the storage device 10001.

Further, the method of realizing each function of the information processing device 100 is not limited to a combination of hardware and a program as described above. Instead, the processing device may be realized by a single piece of hardware such as a large-scale integrated circuit (LSI) in which a program is implemented. Alternatively, a part of the functions of the information processing device 100 may be realized by dedicated hardware and the other functions may be realized by a combination of the processing device and a program.

The information processing device 100 is configured as described above.

Next, the operation of the information processing device 100 according to Embodiment 1 will be described.

Figure 9:
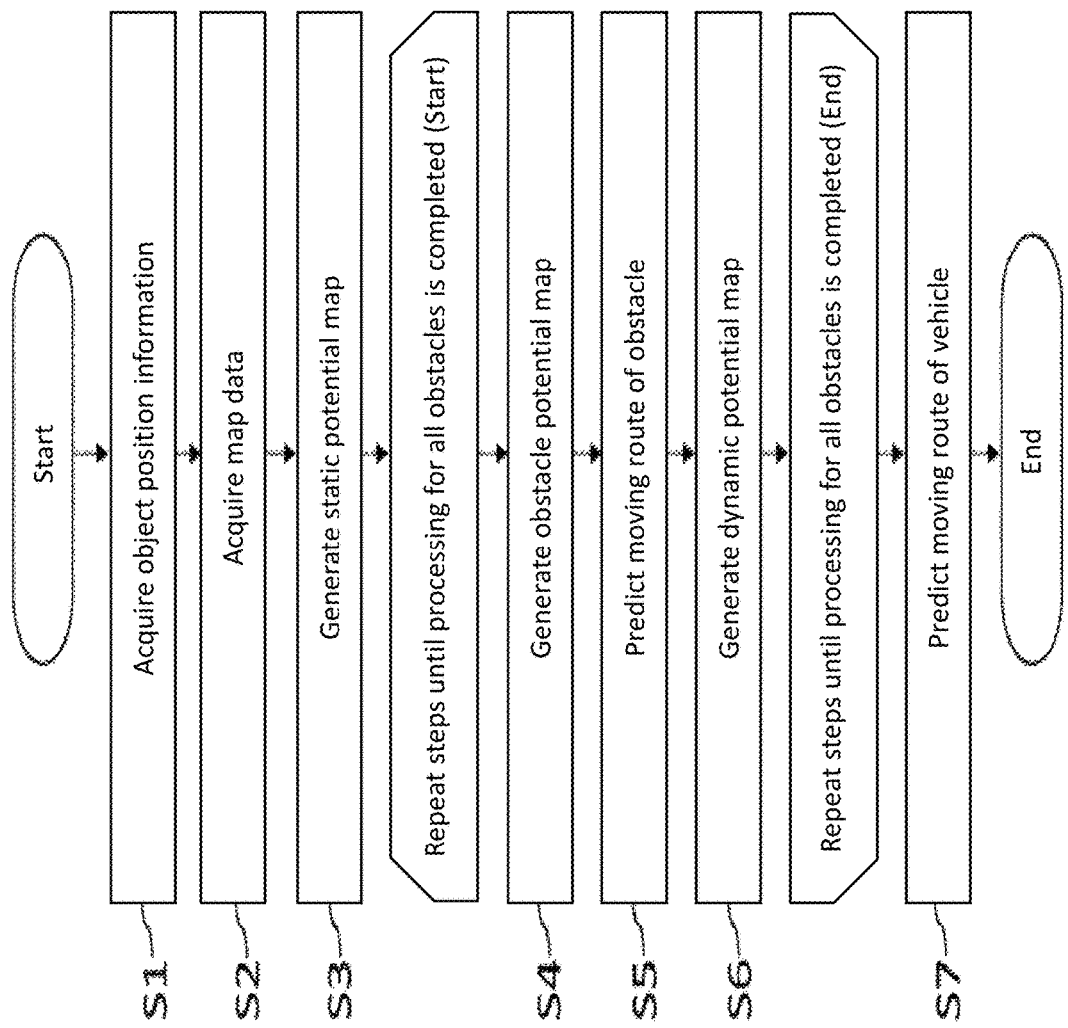
FIG. 9 is a flowchart showing an operation of the information processing device 100 according to Embodiment 1.

FIG. 9 is a flowchart showing the operation of the information processing device 100 according to Embodiment 1.

Here, the operation of the information processing device 100 corresponds to the information processing method, and the program for making the computer execute the information processing method corresponds to the information processing program.

First, in an object position information acquisition step, or Step S1, the object position information acquisition unit 110 acquires information from the various sensors and obtains the position information of objects. More specifically, the object position information acquisition unit 110 acquires the vehicle position information showing the position of the vehicle CA from the locator 200 and identifies the positions of the obstacles existing around the vehicle CA based on the sensor data obtained from the camera 300, the radar 400, and the LiDAR 500 to obtain the obstacle position information showing the positions of the obstacles. In addition, the object position information acquisition unit 110 recognizes the attributes of the obstacles by the sensor data.

Next, in Step S2, the map data acquisition unit 120 acquires map data around the vehicle CA based on the vehicle position information of the vehicle CA acquired by the object position information acquisition unit 110. If the map data has already been obtained from an outside source and stored in the information processing device 100, it is sufficient to simply read the data.

Next, in Step S3, the static potential map generation unit 131 generates a static potential map showing the risk of a traffic accident for the vehicle CA at the present time. More specifically, first, the static potential map generation unit 131 obtains the lane center of the vehicle CA based on the vehicle position information and the map data. Similarly, the lane center of each obstacle is obtained based on the obstacle information and the map data. Based on the information showing the lane centers and the obstacle information obtained as described above, the static potential map generation unit 131 generates a potential map in which the vehicle CA is centered, given by Formula 1.

Next, in an obstacle potential map generation step, or Step S4, the obstacle potential map generation unit 140 generates an obstacle potential map showing the risk of a traffic accident for an obstacle. Step S4 to Step S6 are looped and repeated until the processing for all the obstacles is completed. The order of processing of the obstacles is set in advance by the designer. The processing order may be determined discretionally. For example, one possible way is to process the obstacles in order of their closeness to the vehicle CA and another possible way is to process the obstacles in order of descending value of weight factor due to their attributes in the risk potential calculation.

Next, in an obstacle moving route predicting step, or Step S5, the obstacle moving route prediction unit 150 predicts the moving routes of the obstacles. In Step S6, the dynamic potential map generation unit 132 generates a dynamic potential map based on the moving routes of the obstacles predicted by the obstacle moving route prediction unit 150 and the static potential map.

As described above, the processes from Step S4 to Step S6 are looped until the processing for all the obstacles is completed. To determine whether or not the processing for all the obstacles has been completed, it is good just to count the number of the obstacles at the time of the object position information acquisition unit 110 acquiring the position information of the obstacles first and just to count the processed obstacles next every time the processing of Step S4 to Step S6 is completed so as to determine whether the number of the processed obstacles has reached the number of all the obstacles counted in advance. In the above description, the dynamic potential map is generated inside the loop. In other words, the predicted moving route is reflected in the vehicle potential map every time the processing of single obstacle is completed. However, the dynamic potential map may be generated by reflecting the information of the predicted moving routes in the static potential map at once after the prediction of the moving routes for all the obstacles is completed.

After the above loop processing for all the obstacles is completed, the vehicle moving route prediction unit 160 predicts the moving route of the vehicle CA based on the dynamic potential map and transmits the vehicle moving route prediction information to the vehicle control device 600 in Step S7.

Through the above operations, the information processing device 100 according to Embodiment 1 generates the obstacle potential maps, each of which is a potential map in which an obstacle is centered, and predicts the moving routes of the obstacles based on the obstacle potential maps, which thereby makes it possible to improve the prediction accuracy of the moving routes of the obstacles.

Further, the information processing device 100 according to Embodiment 1 generates the dynamic potential map showing the risk of a traffic accident for a vehicle, the risk being involved when the obstacles move along the moving routes predicted through the above method. This makes it possible to calculate the risk of a traffic accident for the vehicle CA based on the moving routes of the obstacles predicted by the sophisticated way. Furthermore, the information processing device 100 according to Embodiment 1 predicts the moving routes of a vehicle based on the above dynamic potential map. As a result, by predicting the moving routes of the vehicle CA based on the moving routes of the obstacles predicted based on the obstacle potential maps, the prediction accuracy of the moving routes of the vehicle CA can also be improved.

For example, under the situation shown in FIG. 4, if it is assumed that the vehicle MO4 is in a constant acceleration movement, the vehicle MO4 is predicted to go straight. However, the information processing device 100 according to Embodiment 1 can also predict a moving route when the obstacle turns right by predicting moving routes of the obstacle using the obstacle potential map. Further, as shown in FIG. 7, by generating the dynamic potential map showing the risk of a traffic accident for the vehicle CA using the predicted moving route information of the obstacle obtained based on the obstacle potential map, it is possible to accurately predict the moving routes of the vehicle CA in consideration of not only the case in which the vehicle MO41 goes straight but also the case in which it turns right.

Figure 10:
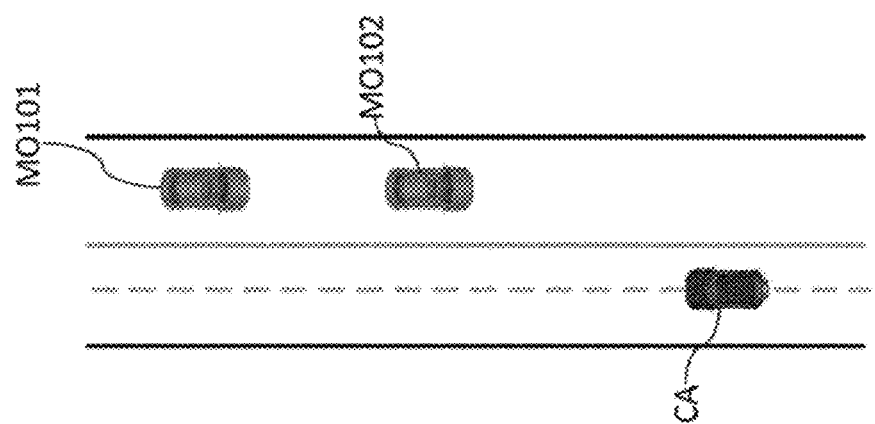
FIG. 10 is a plan view showing the vehicle CA and obstacles around the vehicle CA viewed from above.
Figure 11:
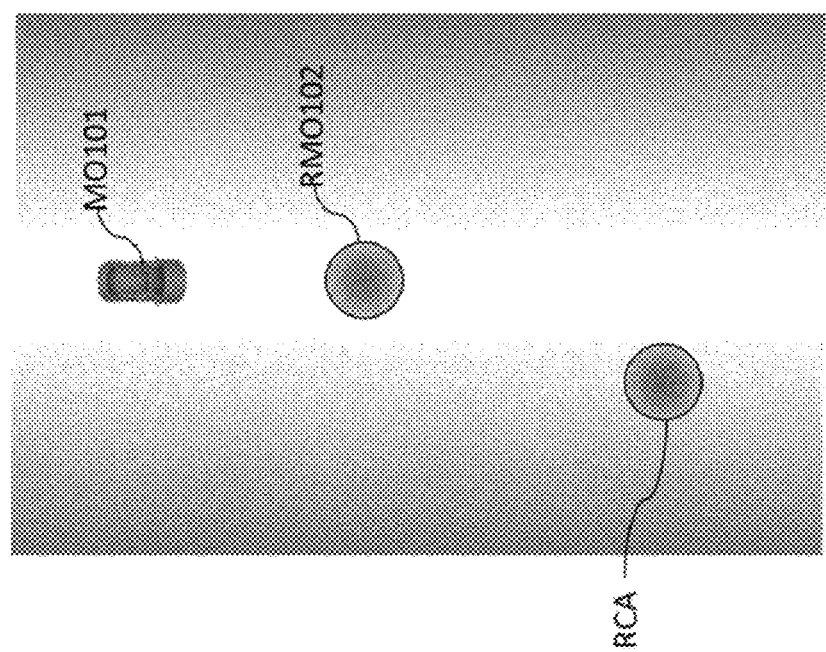
FIG. 11 is a conceptual diagram showing a concrete example of an obstacle potential map.
Figure 12:
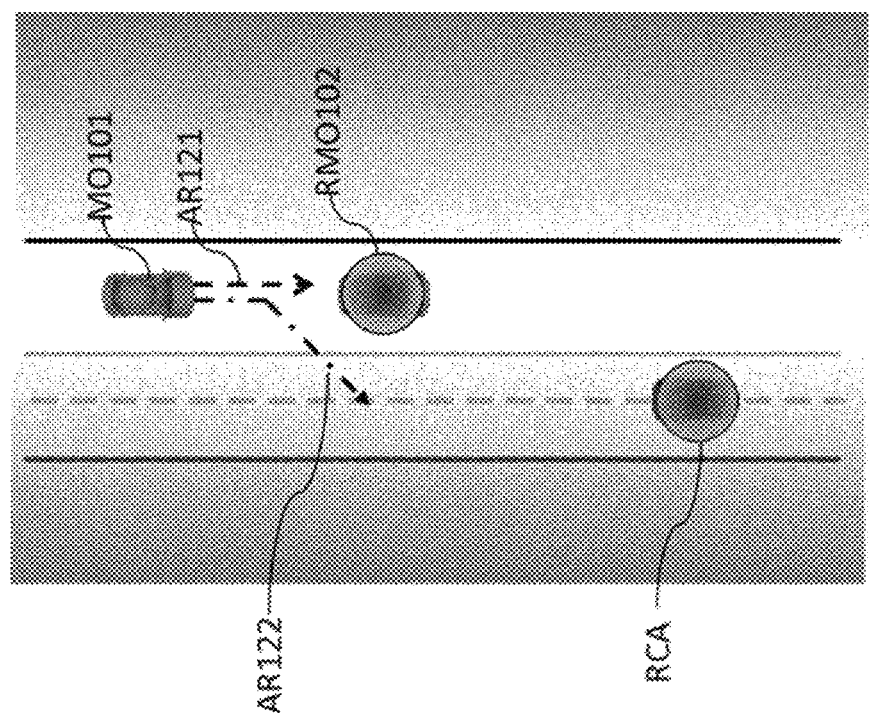
FIG. 12 is a conceptual diagram showing a concrete example of moving routes of the obstacle shown by the obstacle moving route prediction information.

Next, the advantageous effects to be produced by the information processing device 100 in another specific situation will be described with reference to FIGS. 10 to 13. FIG. 10 is a plan view showing the vehicle CA and the obstacles around the vehicle CA viewed from above; FIG. 11 is a conceptual diagram showing a concrete example of the obstacle potential map for a vehicle MO101 which corresponds to the situation of FIG. 10; FIG. 12 is a conceptual diagram showing a concrete example of the moving routes of the vehicle MO101 predicted based on the obstacle potential map shown in FIG. 11; and FIG. 13 is a conceptual diagram showing a concrete example of the dynamic potential map generated based on the predicted moving routes of the vehicle MO101 shown in FIG. 12.

In FIG. 10, the vehicle MO101 and a vehicle MO102 exist around the vehicle CA. Here, it is assumed that the vehicle MO102 is stopped and remains stationary on the road. Under the assumption that the vehicle MO101 is in a constant acceleration movement, if it is decelerating, it is predicted that the vehicle MO101 will stop short before the vehicle MO102. However, in practice, the vehicle MO101 may possibly avoid the vehicle MO102 and temporarily enter the lane of the vehicle CA. At this time, as shown in FIG. 11, the information processing device 100 according to Embodiment 1 predicts the movement of the vehicle MO102 based on the obstacle potential map, so that it is possible to predict, as the routes with minimal values of the cost function calculated based on the risk potential values, the two routes shown in FIG. 12, that is, the route of going straight to stop short before the vehicle CA and the route of turning right to enter the lane of the vehicle CA. As a result, as shown in FIG. 13, the results of predicting the movement of the vehicle MO101 with a sophisticated manner can be reflected in the vehicle potential map.

In FIG. 11, a risk potential RMO102 is the risk potential for the vehicle MO102 in FIG. 10; the risk potential RCA is the risk potential for the vehicle CA in FIG. 10; the gray areas on both sides of the vehicle MO101 show the risk potential by the vehicle MO101 deviating from the lane center. In FIG. 12, the predicted moving route AR121 in a case where the vehicle MO101 goes straight is shown by the dashed arrow, and the predicted moving route AR122 in a case where the vehicle MO101 turns right is shown by the dash-dot-dash arrow.

Figure 13:
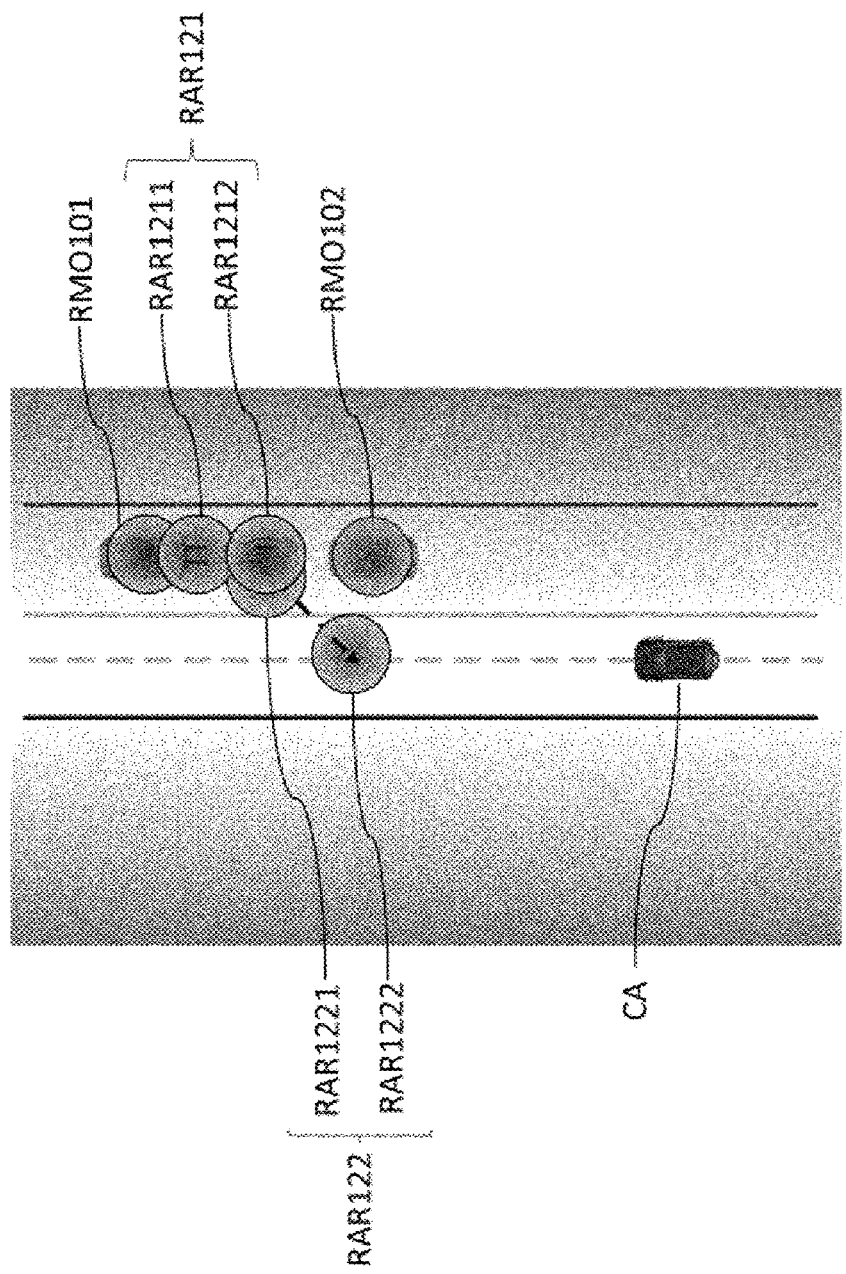
FIG. 13 is a conceptual diagram showing a concrete example of the dynamic potential map.

In FIG. 13, the risk potential RMO102 is the risk potential for the vehicle MO102 in FIG. 10; a risk potential RMO101 is the risk potential of the vehicle MO101 at the present time in FIG. 10; a risk potential RAR121 (a risk potential RAR1211 and a risk potential RAR1212) is the risk potential for the predicted moving route AR121; and a risk potential RAR122 (a risk potential RAR1221 and a risk potential RAR1222) is the risk potential for the predicted moving route AR122. Here, the risk potential RAR1211 and the risk potential RAR1221 are the risk potentials of the vehicle MO101 at time T+u, and the risk potential RAR1212 and the risk potential RAR1222 are the risk potentials of the vehicle MO101 at time T+2u. In addition, in the areas on both of the left side and the right side of the vehicle CA, there exists, as in other figures, a risk potential by the vehicle CA deviating from the lane center.

As shown in FIGS. 10 to 13, the information processing device 100 according to Embodiment 1 can predict the moving routes of the vehicle MO101 not only in a case where it goes straight and stops but also in a case where it turns right and enters the lane of the vehicle CA, and further can generate a dynamic potential map that is the vehicle potential map reflecting the routes in these different cases. Also, by predicting the moving routes based on the dynamic potential map, the moving routes of the vehicle CA, including the moving route in a case where the vehicle MO101 enters the lane of the vehicle CA, can be properly predicted.

Examples of modifications for the information processing device 100 according to Embodiment 1 will be described below.

In the above description, the vehicle potential map generation unit 130 and the obstacle potential map generation unit 140 generate the potential maps using the map data acquired by the map data acquisition unit 120. However, in locations where no map data is available, for example on a mountain road deep in mountains or on a newly created road, the potential maps may be generated only from the object position information and the information obtained by various sensors without using the map data.

In the above description, the vehicle potential map generation unit 130 first generates a static potential map and then reflects the obstacle moving route prediction information in the generated static potential map to generate the dynamic potential map. However, the dynamic potential map may be generated directly without the intermediate steps. For example, the dynamic potential map may be generated according to Formula 5.

[Formula 5]

$$R'(x) = \sum_{i=0}^{n} \sum_{k=0}^{m} \{\alpha_i * \delta_k * \exp(-S_{ik}(r_i(T+ku), a_i(T+ku)) - x)^2 / \sigma_i^2)\} + $$
$$\omega\{1 - \exp(-(x_1 - Y_r)^2 / \sigma_r^2)$$

Also, in the above description, the vehicle potential map generation unit 130 superimposes, on the vehicle potential map at the present time, the multiple different times' risk potentials along the predicted moving routes of the obstacle. However, the vehicle potential map generation unit 130 may generate vehicle potential maps of the multiple different times so as for the risk potentials of the multiple different times along the predicted moving routes of the obstacle to be superimposed on the generated vehicle potential maps. For example, the vehicle potential map may be updated according to Formula 6 shown below. Note that the phrase of "multiple different times" in the above includes continuous time as well as discrete time in its meaning.

[Formula 6]

$$R'(x, t) = \sum_{i=0}^{n} \{\alpha_i * \delta_t * \exp(-S_{it}(r(t), a(t)) - x)^2 / \sigma_i^2)\} + $$
$$\omega\{1 - \exp(-(x_1 Y_r)^2 / \sigma_r^2)$$

Also when generating the vehicle potential map according to Formula 6, the vehicle moving route prediction unit 160 can obtain, in the same manner as previously described, the moving routes of the vehicle CA in a way that the cost function is made minimum. Further, in this case, since the moving routes of the vehicle CA are predicted using the time-dependent potential maps, the influence of the obstacles existing at the same spatial positions at different times can be ignored. As a result, the moving routes of the vehicle can be predicted with higher accuracy.

Furthermore, in the above description, in the process in which the obstacle moving route prediction unit 150 predicts the moving routes of the obstacles, they are predicted under the assumption that all the obstacles other than the targeted are stationary. However, as for the obstacles that are not targeted, their moving routes may be predicted using a conventional movement prediction method such as a Kalman filter. In that case, under the assumption that the positions of the obstacles that are not targeted, or $X_k(t)$ ($k \neq i$), move along the moving routes predicted by the conventional prediction method, the obstacle potential map of the target obstacle (k=i) can be generated according to Formula 7.

[Formula 7]
$$U_i(x, t) = \sum_{k=0}^{n} \{\alpha_k * \beta_{ki} * \exp(-(X_k(t) - x)^2 / \sigma_k^2)\} + \{\gamma_k * \exp(-(C - x)^2 / \sigma_c^2)\} + \omega\{1 - \exp(-(X_{i1} - Y_i)^2 / \sigma_{r2})\}$$

Alternatively, with the assumption that the obstacles whose moving routes have already been predicted (k=0 to i−1) move according to the moving routes predicted by Formula 3 and the obstacles whose moving routes have not been predicted yet (k=i+1 to n) move according to the moving routes predicted by using a Kalman filter or the like, the obstacle potential map of the target obstacle (k=i) may be generated according to Formula 8.

[Formula 8]
$$U_i(x, t) = \sum_{k=0}^{i-1} \{\alpha_k * \exp(-(S_{ki}(r_k(t), a_k(t)) - x^2 / \sigma_k^2)\} + \sum_{k=i+1}^{n} \{\alpha_k * \exp(-(X_k(t) - x)^2 / \sigma_k^2)\} + \{\gamma_k * \exp(-(C - x)^2 / \sigma_c^2)\} + \omega\{1 - \exp(-(X_{i1} - Y_i)^2 / \sigma_r^2)\}$$

In the above description, in the operation of the information processing device 100 shown in FIG. 9, the processing of Step S4 and Step S5 are performed for all the obstacles. However, only for some of the obstacles, for example, the obstacle closest to the vehicle CA, the dynamic potential map may be generated by performing Step S4 and Step S5, and for the rest of the obstacles, the dynamic potential map may be generated by performing Step S6 by considering them to be stationary or to move according to the moving routes predicted by the conventional technique. If the movement prediction is performed for all of the obstacles based on obstacle potential maps, the sophisticated movement prediction can be made. If the movement prediction described above is performed only for selected obstacles, the calculation cost can be reduced while the sophisticated movement prediction for the crucial obstacles is performed.

Since the information processing device 100 in Embodiment 1 is an in-vehicle device mounted on the vehicle CA, it can predict the moving routes of the obstacles and the vehicle CA even in a poor communication environment. Moreover, since one information processing device 100 predicts moving routes for operating one vehicle CA, the calculation load on the one information processing device 100 can be reduced. However, if the vehicle CA moves in an area with a good communication environment and a computer used for the information processing device 100 has high computing power, the information processing device 100 may be realized by a computer provided outside the vehicle CA so as for the movement prediction results on the obstacles and the vehicle CA to be transmitted to the vehicle CA.

Although the potentials of the vehicle CA and the obstacles are expressed by normal distributions in the above description, another distribution function can be used. For example, it is possible to use a box function or it is possible to use a normal distribution for a stationary object and to use a distribution function whose shape is a Doppler-shifted normal distribution along the traveling direction etc for a moving object.

In the previous description, the obstacle moving route prediction unit 150 transmits the obstacle moving route prediction information showing the predicted moving routes of the obstacles to the vehicle potential map generation unit 130. In doing so, the predicted steering values and velocities of the obstacles may be included in the obstacle moving route prediction information to be transmitted. At this time, the vehicle potential map generation unit 130 may set the potential values of the obstacles based on not only the positions of the obstacles but also the steering values and velocities thereof.

INDUSTRIAL APPLICABILITY

The information processing device according to the present disclosure is suitable for use in an automatic driving system.

DESCRIPTION OF SYMBOLS 100 information processing device,
1000 information processing system,
200 locator,
300 camera,
400 radar,
500 LiDAR,
600 vehicle control device,
110 object position information acquisition unit,
120 map data acquisition unit,
130 vehicle potential map generation unit,
131 static potential map generation unit,
132 dynamic potential map generation unit,
140 obstacle potential map generation unit,
150 obstacle moving route prediction unit,
160 vehicle moving route prediction unit

The invention claimed is:
1. An information processing device comprising:
object position information acquisition circuitry to acquire obstacle position information showing a position of at least one obstacle existing around a vehicle and vehicle position information showing a position of the vehicle;
obstacle potential map generation circuitry to generate an obstacle potential map of risk of a traffic accident for the at least one obstacle based on the obstacle position information;

obstacle moving route prediction circuitry to predict a moving route of the at least one obstacle based on the obstacle potential map and to generate obstacle moving route prediction information; and vehicle potential map generation circuitry to generate, based on the vehicle position information and the obstacle moving route prediction information, a dynamic potential map of risk of a traffic accident for the vehicle in a case where the at least one obstacle moves along the predicted moving route shown by the obstacle moving route prediction information, wherein the object position information acquisition circuitry acquires, as the obstacle position information, position information including stationary obstacle position information showing a position of at least one stationary obstacle out of the at least one obstacle and moving obstacle position information showing a position of at least one moving obstacle out of the at least one obstacle, the obstacle potential map generation circuitry generates, as the obstacle potential map, a moving obstacle potential map of risk of a traffic accident for the at least one moving obstacle based on the moving obstacle position information, the obstacle moving route prediction circuitry generates, as the obstacle moving route prediction information, moving obstacles' moving route prediction information predicting a moving route of the at least one moving obstacle based on the moving obstacle potential map, and the vehicle potential map generation circuitry comprises
static potential map generation circuitry to generate a static potential map of risk of a traffic accident for the vehicle, the risk being caused at least by the at least one stationary obstacle, based on at least the stationary obstacle position information in addition to the vehicle position information, and
dynamic potential map generation circuitry to generate the dynamic potential map based on the static potential map and the moving obstacles' moving route prediction information.

2. The information processing device according to claim 1, wherein the vehicle potential map generation circuitry generates the dynamic potential map at each of multiple different times.

3. The information processing device according to claim 1, wherein the obstacle moving route prediction circuitry predicts a plurality of moving routes for each of the at least one obstacle at each time.

4. The information processing device according to claim 2, wherein the obstacle moving route prediction circuitry predicts a plurality of moving routes for each of the at least one obstacle at each time.

5. An information processing system comprising:
a locator to locate a position of a vehicle;
a sensor to detect surroundings around the vehicle;
object position information acquisition circuitry to acquire vehicle position information showing a position of the vehicle from the locator and to obtain obstacle position information showing a position of at least one obstacle existing around the vehicle based on sensor data acquired from the sensor;
obstacle potential map generation circuitry to generate an obstacle potential map of risk of a traffic accident for the at least one obstacle based on the obstacle position information;

obstacle moving route prediction circuitry to predict a moving route of the at least one obstacle based on the obstacle potential map and to generate obstacle moving route prediction information;
vehicle potential map generation circuitry to generate, based on the vehicle position information and the obstacle moving route prediction information, a dynamic potential map of risk of a traffic accident for the vehicle in a case where the at least one obstacle moves along the predicted moving route shown by the obstacle moving route prediction information;
vehicle moving route prediction circuitry to predict a moving route of the vehicle based on the dynamic potential map; and
a vehicle control device to control the vehicle based on the moving route predicted by the vehicle moving route prediction circuitry, wherein
the object position information acquisition circuitry acquires, as the obstacle position information, position information including stationary obstacle position information showing a position of at least one stationary obstacle out of the at least one obstacle and moving obstacle position information showing a position of at least one moving obstacle out of the at least one obstacle,
the obstacle potential map generation circuitry generates, as the obstacle potential map, a moving obstacle potential map of risk of a traffic accident for the at least one moving obstacle based on the moving obstacle position information,
the obstacle moving route prediction circuitry generates, as the obstacle moving route prediction information, moving obstacles' moving route prediction information predicting a moving route of the at least one moving obstacle based on the moving obstacle potential map, and
the vehicle potential map generation circuitry comprises
static potential map generation circuitry to generate a static potential map of risk of a traffic accident for the vehicle, the risk being caused at least by the at least one stationary obstacle, based on at least the stationary obstacle position information in addition to the vehicle position information, and
dynamic potential map generation circuitry to generate the dynamic potential map based on the static potential map and the moving obstacles' moving route prediction information.

6. An information processing method comprising:
acquiring obstacle position information showing a position of at least one obstacle existing around a vehicle and vehicle position information showing a position of the vehicle;
generating an obstacle potential map of risk of a traffic accident for the at least one obstacle based on the obstacle position information;
predicting a moving route of the at least one obstacle based on the obstacle potential map and generating obstacle moving route prediction information; and
generating, based on the vehicle position information and the obstacle moving route prediction information, a dynamic potential map of risk of a traffic accident for the vehicle in a case where the at least one obstacle moves along the predicted moving route shown by the obstacle moving route prediction information, wherein
in acquiring the obstacle position information, position information including stationary obstacle position information showing a position of at least one stationary obstacle out of the at least one obstacle and moving obstacle position information showing a position of at least one moving obstacle out of the at least one obstacle is acquired as the obstacle position information, in generating the obstacle potential map, a moving obstacle potential map of risk of a traffic accident for the at least one moving obstacle based on the moving obstacle position information is generated as the obstacle potential map, in predicting the moving route and generating the obstacle moving route prediction information, moving obstacles' moving route prediction information predicting a moving route of the at least one moving obstacle based on the moving obstacle potential map is generated as the obstacle moving route prediction information, and generating the vehicle potential map comprises
- generating a static potential map of risk of a traffic accident for the vehicle, the risk being caused at least by the at least one stationary obstacle, based on at least the stationary obstacle position information in addition to the vehicle position information, and
- generating the dynamic potential map based on the static potential map and the moving obstacles' moving route prediction information.

* * * * *